United States Patent [19]

Adam et al.

[11] Patent Number: 4,767,795
[45] Date of Patent: Aug. 30, 1988

[54] POLYOL COMPOSITION AND A PROCESS FOR THE PREPARATION OF FLAME-RESISTANT POLYURETHANE FOAMS THEREFROM

[75] Inventors: Norbert Adam, Cologne; Reinhard Kaufung, Leverkusen; Rolf Wiedermann, Odenthal, all of Fed. Rep. of Germany

[73] Assignee: Bayer Aktiengesellschaft, Leverkusen, Fed. Rep. of Germany

[21] Appl. No.: 63,185

[22] Filed: Jun. 17, 1987

[30] Foreign Application Priority Data

Jul. 4, 1986 [DE] Fed. Rep. of Germany ....... 3622594
Aug. 29, 1986 [DE] Fed. Rep. of Germany ....... 3629390

[51] Int. Cl.$^4$ .............................................. C08G 18/14
[52] U.S. Cl. .................................. 521/99; 252/182.27
[58] Field of Search ............... 252/182; 521/107, 131, 521/132, 99, 167

[56] References Cited

U.S. PATENT DOCUMENTS 4,209,609  6/1980  Haas ................................... 528/421
4,397,966  8/1983  Stolz et al. .......................... 521/167
4,410,641 10/1983  Narayan et al. .................... 521/167
4,421,871 12/1983  Korczak et al. .................... 521/167
4,469,822  9/1984  Stolz et al. .......................... 521/167
4,562,290 12/1985  Korczak et al. .................... 564/399

FOREIGN PATENT DOCUMENTS 3509959  3/1987  Fed. Rep. of Germany .
1311095  3/1973  United Kingdom .

*Primary Examiner*—Maurice J. Welsh
*Attorney, Agent, or Firm*—Gene Harsh; Joseph C. Gil; Lyndanne M. Whalen

[57] ABSTRACT

Flame resistant polyurethane foams are made by reacting a polyisocyanate with a specific polyol composition. This polyol composition is made up of (a) at least 10 wt. % of a polyether formed by the addition of alkylene oxide(s) to 2,3- and/or 3,4-tolylenediamine having an OH number of from 400 to 520, (b) at least 20–50 wt. % flame retardant containing phosphorus and/or halogen, (c) 5–10 wt. % chain lengthening or cross-linking agent, (d) surface active agents, (e) water and (f) 0–30 wt. % polyhydroxyl compound(s) other than (a) having a molecular weight of from 300 to 10,000.

14 Claims, No Drawings

POLYOL COMPOSITION AND A PROCESS FOR THE PREPARATION OF FLAME-RESISTANT POLYURETHANE FOAMS THEREFROM

BACKGROUND OF THE INVENTION

The present invention relates to polyol compositions useful in the production of flame-resistant polyurethane foams.

Rigid polyurethane foams are frequently used as insulating materials for insulating against heat or cold. Very thick insulating layers which are gradually being required to satisfy building regulations in many countries present many new technical problems in the construction of buildings.

There is therefore a demand for insulating materials having a very low thermal conductivity combined with high flame resistance.

Polyurethane foams generally have very low thermal conductivity values but it is known that certain polyols or additives provide exceptionally low values. Foams made with 2,4- and/or 2,6- tolylenediamine polyethers conforming to these requirements are described in German Patent Application No. P 3,509,959.

The use of 2,3- and/or 3,4-tolylenediamine (TDA) polyethers has been described in the literature. For example, the use of such polyethers for the production of flame-resistant PUR rigid foams has been proposed in DE-OS No. 2,017,038, U.S. Pat. Nos. 4,209,609, 4,421,871, 4,397,966, 4,562,290 and 4,469,822. These disclosures do not, however, give any indication that rigid foams produced from such polyethers would conform to fire classification B2. The use of polyether polyols based on 2,3- and/or 3,4-TDA for the production of flame-resistant rigid foams is proposed in U.S. Pat. No. 4,410,641 but this patent requires an index range of 150 to 500. The foams obtained at such indices are, however, brittle and frequently unsuitable for use.

SUMMARY OF THE INVENTION

It is an object of the present invention to provide a polyol composition useful in the production of flame-resistant polyurethane foams.

It is also an object of the present invention to provide a process for producing polyurethane foams having improved thermal conductivity and flame resistance. It is also an object of the present invention to produce foams having better thermal conductivity than the known foams produced from 2,4- and/or 2,6-tolylenediamine polyethers.

These and other objects which will be apparent to those skilled in the art are accomplished by using a polyol composition made up of (a) at least 10 wt. %, preferably 10-49 wt. % alkylene oxide polyethers having OH numbers of from 400 to 520 which are produced by adding an alkylene oxide to 2,3- and/or 3,4-tolylenediamine, (b) 20-46 wt. % flame retardant containing phosphorus and/or halogen, (c) 5-10 wt. % chain lengthening/crosslinking agent having at least two active hydrogen atoms, (d) surface active agent, (e) water, and (f) 0-30 wt. %, preferably 0-25.89 wt. % other polyhydroxyl compounds having molecular weights of from 300 to 10,000 to produce a polyurethane foam. More specifically, the above-identified polyol composition is reacted with a polyisocyanate optionally in the presence of a blowing agent to produce a flame-retardant foam having improved thermal conductivity.

DETAILED DESCRIPTION OF THE INVENTION

The present invention relates to a polyol composition and the production of flame-retardant polyurethane foams in which very low values for thermal conductivity are combined with excellent toughness.

The polyol composition is made up of:
(a) at least 10 wt. %, preferably 10 to 49 wt. %, most preferably 15 to 40 wt. % of a polyether with a hydroxyl number of from 400 to 520 which contains at least two hydroxyl groups and is produced by the addition of alkylene oxides to 2,3- and/or 3,4-tolylenediamine,
(b) at least 20 wt., preferably 20 to 46 wt. % of flame-retardant containing phosphorus and/or halogen which may or may not be capable of being incorporated into a foam structure,
(c) 5 to 10 wt. % of a chain-lengthening/crosslinking agent having a molecular weight of from 32 to 299 and containing at least two Zerewitinoff-active hydrogen atoms,
(d) 0.1 to 2.5 wt. % of surface-active agents,
(e) 0 to 2 wt. %, preferably 0.01 to 2 wt. % of water, and
(f) 0 to 30 wt. % of other relatively high molecular weight polyhydroxyl compounds having molecular weights in the range of from 300 to 10,000, preferably from 356 to 10,000, more preferably from 400 to 10,000. Polyhydroxyl compounds in the molecular weight range of 356–1,000 which are at least trifunctional are most preferred. The sum of components (a) through (f) totals 100 wt. %.

It has been found that use of the polyether polyols which have been obtained from 2,3- and/or 3,4-TDA ("ortho-TDA" or "vic-TDA") with the addition of mixtures of ethylene oxide and propylene oxide as alkylene oxide of the present invention results in the production of polyurethane foams having exceptionally low $\lambda$ values. The alkylene oxides used are preferably 10 to 90% ethylene oxide, more preferably 20 to 80% ethylene oxide and 90 to 10%, preferably 80 to 20% propylene oxide. The "vic-TDA" is a pure isomer or mixture thereof, preferably containing 20 to 80 wt. % 2,3-TDA and 80 to 20 wt. % 3,4-TDA.

The fire resistance characteristics and curing are less advantageous when the hydroxyl number of the TDA-based polyether polyols required in the present invention is less than 400. Polyether polyols having OH numbers of from 410 to 520, in particular from 450 to 500 are therefore the preferred polyether polyols.

The polyol compositions of the present invention are used for the production of flame-resistant rigid foams conforming to building material classification B2 according to DIN 4102. These rigid foams have exceptionally low thermal conductivity values if the blowing agent for their preparation is trichlorotrifluoroethane used either alone or in combination with other blowing agents.

Fillers such as carbon black and/or aluminum powder further reduce the thermal conductivity of foams made with the system of the present invention and are therefore preferred.

Foaming catalysts, color pastes, dyes, antioxidants and/or other conventional additives may also be included in the polyol compositions of the present invention.

The polyether polyol (a) in the polyol composition may be prepared in known manner by the addition of alkylene oxides to 2,3- and/or 3,4-tolylenediamines. This polyol generally has a molecular weight of from 400 to 550 and an OH number of from 410 to 520.

Component (b) of the polyol composition is a flame-retardant containing phosphorus and/or halogen which may or may not be capable of being structurally incorporated into a foam. A flame-retardant which cannot be structurally incorporated is preferred. It is also preferred that such flame retardant be used in the polyol composition in a quantity of 25 to 45 wt. %.

Examples of the preferred flame-retardants which cannot be structurally incorporated include halogen flame-retardants in the form of chlorinated and/or brominated compounds containing in particular 50 to 88 wt. % of halogen, e.g. Dechlorane® 604 or Dechlorane 510 of Hooker Chemicals, Niagara Falls/USA. Brominated aromatic compounds such as pentabromotoluene or hexabromobenzene are preferred, but less volatile aromatic bromine compounds such as tetrabromo-4,4-dihydroxyphenyl-dimethylmethane, brominated diphenylethers containing about 67 to 71 wt. % bromine with pentabromodiphenylether as the main constituent of the mixture and more highly brominated diphenylethers such as decabromodiphenylether containing 82 to 83 wt. % bromine and brominated polyphenylethers are even more preferred. Pentabromodiphenylether is most preferred. Examples of suitable flame-retardants containing phosphorus include phosphoric acid triesters such as aliphatic phosphates (e.g., trioctylphosphate or tridodecylphosphate) and araliphatic phosphoric esters (e.g., diphenyl-dodecylphosphate) but aromatic phosphates (e.g. triphenylphosphate) are preferred. Diphenyl-cresylphosphate is particularly preferred.

Component (c) of the polyol composition may be any one of the known compounds containing at least two isocyanate reactive hydrogen atoms and having a molecular weight of from 32 to 299. These compounds include compounds containing hydroxyl groups and/or amino groups and/or thiol groups and/or carboxyl groups, preferably hydroxyl groups and/or amino groups, and they serve as crosslinking agents. They generally contain 2 to 8, preferably 2 to 4 isocyanate reactive hydrogen atoms.

Examples of such compounds include: ethylene glycol, (1,2)- and (1,3)-propanediol, (1,4)- and (2,3)-butanediol, (1,5)-pentanediol, (1,6)-hexanediol, (1,8)-octanediol, neopentyl glycol, 1,4-bis-hydroxymethyl-cyclohexane, 2-methyl-1,3-propanediol, dibromobutenediol (U.S. Pat. No. 3,723,392), glycerol (particularly preferred), trimethylolpropane, (1,2,6)-hexanetriol, trimethylolethane, pentaerythritol, quinitol, mannitol and sorbitol, castor oil, 2,3-dibromo-2-butenediol-(1,4), diethylene glycol, triethylene glycol, tetraethylene glycol, higher polyethylene glycols with molecular weights of up to 299, dipropylene glycol, higher polypropylene glycols with molecular weights of up to 299, dibutylene glycol, higher polybutylene glycols with molecular weights of up to 299, 4,4-dihydroxy-diphenylpropane, ethanolamine, diethanolamine, N-methyl-diethanolamine, triethanolamine and 3-aminopropanol.

Component (d) of the polyol composition is a surface active agent such as an emulsifier and/or foam stabilizer. Suitable emulsifiers include, the sodium salts of ricinoleic sulphonates and salts of fatty acids with amines, such as oleic acid diethylamine and stearic acid diethanolamine. Alkali metal or ammonium salts of sulphonic acids (e.g. dodecylbenzenesulphonic acid and dinaphthylmethane disulphonic acid) or of fatty acids (e.g. ricinoleic acid) or of polymeric fatty acids may also be used as surface active additives.

Foam stabilizers useful in the present invention are primarily polyether siloxanes, especially those which are water-soluble. These compounds are generally a copolymer of ethylene oxide and propylene oxide attached to a polydimethyl-siloxane group. Foam stabilizers of this kind are described, for example, in U.S. Pat. Nos. 2,834,748, 2,917,480 and 3,629,308. Surface-active agents which are free from silicone, however, are of particular interest for the purpose of this invention.

Compounds in the molecular weight range of 300 to 10,000 containing hydroxyl groups (component f) optionally present in the polyol composition are to be distinguished from component (a). They are well known in the art and may for example, be polyethers or polyesters containing two or more, preferably more than three hydroxyl groups. Examples are given in DE-A No. 2,832,253, pages 11 to 18.

Particularly preferred are the polyether polyols which are at least trifunctional (e.g. tetrafunctional polyether polyols) and have a molecular weight of 356 to 1000. Products of addition of ethylene oxide and/or propylene oxide to triols, tetrols, pentols, hexols or sugar or to polyamines containing primary and/or secondary amino groups and optionally in addition tertiary amino groups are specific examples. Compounds containing tertiary amino groups obtained as products of addition to the aforesaid polyamines, especially to aliphatic or cycloaliphatic polyamines such as ethylene diamine, are particularly preferred.

The preparation of polyurethane foams using the polyol composition of the present invention may be carried out by the known one-shot process, the prepolymer process or the semiprepolymer process. In many cases mechanical devices such as those described in U.S. Pat. No. 2,764,565 are used. Details concerning processing apparatus suitable for use in the practice of the present invention are given in Kunststoff-Handbuch, Volume VII, published by Vieweg and Höchtlen, Carl-Hanser-Verlag, Munich 1966, e.g. on pages 121 to 205.

In these processes for producing polyurethane foams, the polyol composition is reacted with a polyisocyanate and optionally additives in a known manner to produce rigid polyurethane foams having unit weights of up to 70 kg/m$^3$, preferably up to 45 kg/m$^3$. Foams with a unit weight $\geq$30 kg/m$^3$ (conforming to the standard) are preferred. Foams having unit weights of 30 to 45 kg/m$^3$ are preferably used for the continuous manufacture of insulating panels while those with higher unit weights, in particular 60$\pm$10 kg/m$^3$, are particularly useful for spray foam systems for roofs. Experience has shown that the thermal conductivity ($\lambda$ value) of foams increases with increasing unit weight. Polyether polyols based on EO/PO mixed alkoxylation products have more favorable values than those based on PO (propylene oxide) alkylation alone.

It is generally preferred to use commercially readily available polyisocyanates such as polyphenyl-polymethylene polyisocyanates which may be prepared by aniline-formaldehyde condensation followed by phosgenation ("crude MDI"), mixtures of 2,4- and/or 2,6-tolylene diisocyanate, and so-called modified polyisocyanates which have been modified, e.g., with carbodiimide groups, urethane groups, allophanate groups, isocyanate groups, urea groups or biuret groups. Modified polyisocyanates which are derived from 2,4- and/or 2,6-tolylene diisocyanate or from 4,4- and/or 2,4-diphenylmethane diisocyanate are especially preferred. Other known polyisocyanates may also be used however.

The polyol composition contains water which acts as a blowing agent. Organic blowing agents may be used in addition to the water. Examples of organic blowing agents include halogen-substituted alkanes such as methylene chloride, chloroform, ethylidene chloride, vinylidene chloride, monofluorotrichloromethane, chlorodifluoromethane and dichlorodifluoromethane. If used, these organic blowing agents are generally used in a quantity of from 10 to 50 wt. % based on the polyol mixture. Trichlorotrifluoroethane is a particularly preferred blowing agent. Other examples of blowing agents optionally used and details concerning the use of blowing agents may be found in Kunststoff-Handbuch, Volume VII, published by Vieweg and Höchtlen, Carl-Hanser-Verlag, Munich 1966, e.g. on pages 108 and 109, 453 to 455 and 507 to 510.

The additives useful in the preparation of foams in accordance with the present invention may include known catalysts; stabilizers against ageing and weathering; softeners and fungistatic and bacteriostatic substances; color producing substances and fillers such as barium sulphate, aluminum hydroxide (2 to 40 m, e.g. Martinal® B2 of Martinswerk GmbH, Bergheim-/Erft), $Sb_2O_3$, kieselguhr or whiting. Carbon black and aluminum powder are particularly preferred because they enable lower λ values to be obtained than would be achieved without using them. These additives may be added to the polyol composition of the present invention in their usual quantities.

Examples of catalysts suitable for the invention and details concerning the mode of action of the catalysts may be found, for example, in Kunststoff-Handbuch, Volume VII, published by Vieweg and Höchtlen, Carl-Hanser-Verlag, Munich 1966, e.g. on pages 96 to 102 and have been fully described in the patent literature.

The catalysts are generally used in a quantity of from about 0.001 to 10 wt. %, based on the polyol composition.

Preparation of foams in accordance with the present invention is generally carried out at an isocyanate index in the range of from 105 to 145, preferably from 116 to 145 because the fire characteristics are improved at these indexes and the foams are not brittle.

The invention is further illustrated but is not intended to be limited by the following examples in which all parts and percentages are by weight unless otherwise specified.

EXAMPLES

Rigid polyurethane foam panels were produced in a known manner by mechanically mixing the components in a conventional laminator apparatus and then tested for their fire characteristics and thermal conductivity (see Tables).

Comparison Examples 1, 2, 6 and 9 are not in accordance with the invention. A comparison of Example 3 with Comparison Example 1 shows that vic-TDA polyether mixture of 2,3- and 3,4-tolylenediamine (wt. ratio of 2,3- to 2,4-isomer=40:60) results in a foam with a lower λ value than a foam made with TDA-80/20 (80 wt. % of 2,4- and 20 wt. % of 2,6-tolylenediamine) polyether (both polyethers based on ethylene oxide/propylene oxide alkoxylation).

A comparison of Examples 4 and 5 shows that addition of carbon black improves the λ value.

Example 2 shows that a polyether containing only propylene oxide in the polyether chain produces a foam with a less favorable λ value than a foam made with the preferred ethylene oxide/propylene oxide mixed ethers.

A comparison of Example 7 with Example 6 shows the improvement in properties and fire characteristics of a foam according to the present invention containing a polyol in the preferred OH range of 410 to 550 over those of a foam prepared from a polyether with a lower OH number.

The great toughness of the foams according to the invention is demonstrated in Example 7 in which the abrasion figure is only 1.3% while foams obtained according to Examples 1 to 31 of U.S. Pat. No. 4,410,641 have higher abrasion figures.

A comparison of Examples 4 and 8 shows that a particularly great reduction in λ value is obtained by using trichlorotrifluoroethane as the blowing agent.

Comparison Example 9 demonstrates that both the vic-TDA polyether and the quantity of flame retardant influence the λ value.

| | Comparison Example 1 | Comparison Example 2 | Ex. 3 | Ex. 4 | Ex. 5 | Comparison Example 6 | Ex. 7 | Ex. 8 | Comparison Example 9 | Component of Polyol Composition |
|---|---|---|---|---|---|---|---|---|---|---|
| Sugar-propylene glycol-propylene oxide polyether, OH number 470 | — | — | — | — | — | — | — | — | 40 | f |
| TDA-80/20[1]-EO-PO-polyether, OH number 470 | 30 | — | — | — | — | — | — | — | — | f |
| Ethylene diamine-PO-polyether, OH number 630 | 15 | 20 | 15 | 15 | 15 | 15 | 15 | 15 | 10 | f |
| Vicinal-TDA[2]-EO-PO polyether, OH number 470[3] | — | — | 30 | 30 | 30 | — | 30 | 30 | 30 | a |
| Vicinal-TDA[2]-PO-polyether, OH number 400 | — | 26 | — | — | — | — | — | — | — | a |
| Vicinal-TDA-EO/PO-polyether, OH number 380[4] | — | — | — | — | — | 30 | — | — | — | f |
| Glycerol | 9 | 10 | 9 | 9 | 9 | 9 | 9 | 9 | 10 | c |
| Dimethyl-N,N—bis-(hydroxypropyl)-amino- | 9 | 10 | 9 | 9 | 9 | 9 | 9 | 9 | — | b |

-continued

| | Comparison Example 1 | Comparison Example 2 | Ex. 3 | Ex. 4 | Ex. 5 | Comparison Example 6 | Ex. 7 | Ex. 8 | Comparison Example 9 | Component of Polyol Composition |
|---|---|---|---|---|---|---|---|---|---|---|
| methylphosphate | | | | | | | | | | |
| Dibromobutenediol-epichlorohydrin polyether (OH number 330; 32% Br; 6.8% Cl) | 20 | 20 | 20 | 20 | 20 | 20 | 20 | 20 | — | b |
| Trichloroethylphosphate | 15 | 12 | 15 | 15 | 15 | 15 | 15 | 15 | 10 | b |
| Silicone stabilizer* | 1.4 | 1.4 | 1.4 | 1.4 | 1.4 | 1.4 | 1.4 | 1.4 | 1.4 | d |
| Water | 0.6 | 0.6 | 0.6 | 0.6 | 0.6 | 0.6 | 0.6 | 0.6 | 0.7 | e |
| Trichlorofluoromethane | 32 | 33 | 33 | 33 | 33 | 33 | 33 | 20 | 31 | |
| Trichlorotrifluoroethane | — | — | — | — | — | — | — | 20 | — | |
| Dimethylcyclohexylamine | 1.4 | 1.6 | 1.1 | 1.2 | 1.2 | 1.2 | 1.2 | 1.6 | 2.0 | |
| Black paste | — | — | — | — | 1 | — | — | — | — | |
| "Crude MDI" containing about 48% 2,4'- and 4,4'-diphenyl-methane diisocyanate | 144 | 149 | 150 | 150 | 150 | 150 | 150 | 150 | 143 | |
| Index | 110 | 110 | 110 | 110 | 110 | 110 | 110 | 110 | 110 | |
| Gel time (laminator) | 35 | 34 | 32 | 30 | 30 | manual foaming | | 30 | 27 | |
| Fire characteristics DIN 4102 (height of flame) | B2 | B2 | B2 | B2 | B2 | B2 (140 mm) | B3 (130 mm) | B2 | B3 | |
| λ value determined* after 6 weeks at 10° C. (W/mK) | 0.0156 | 0.0165 | 0.0149 | 0.0154 | 0.0150 | — | — | 0.0150 | 0.0180 | |
| Gross density of test plate | 35 | 36 | 37 | 37 | 36 | manual foaming | | 36 | 35 | |
| Abrasion test (ASTM) | — | — | — | — | — | — | 1.3% | — | — | |
| Facing material | 80 μm Alu | 80 μm Alu | 80 μm Alu | 5-layered complex | — | — | — | 5-layered complex | — | |

(1)Tolylenediamine, mixture of 80 wt. % of 2,4- and 20 wt. % of 2,6-isomer
(2)Tolylenediamine, mixture of 2,3- and 3,4-isomers (40:60 wt. %)
(3)EO/PO - 44.7/55.3 ratio by weight
(4)EO/PO - approximately 4/5 mol ratio
EO = ethylene oxide
PO = propylene oxide
*(Tegostab ® B 8404 of Goldschmidt AG, Germany)
*(according to DIN 52612)

TABLE 2

| | Ex. 10 | Ex. 11 | Ex. 12 | Component according to the invention |
|---|---|---|---|---|
| Phthalic acid/diethyleneglycol ester, OH number 290 | 20 | 18.5 | — | f |
| Vicinal-TDA-EO-PO-polyether, OH number 500(3) | — | — | 30 | a |
| Ethylenediamine-PO-polyether, OH number 630 | 7 | 10 | 15 | f |
| Vincinal-TDA(2)-EO-PO-polyether, OH number 470(3) | 36 | 31 | — | a |
| Glycerol | 7 | 8 | 9 | c |
| Dimethyl-N,N—bis-(hydroxypropyl)-aminomethylphosphonate | — | — | 9 | b |
| Dibromobutenediol-epichlorohydrin-polyether (OH number 330; 32% Br; 6.8% Cl) | — | — | 20 | b |
| Tris-chloropropylphosphate | 29.7 | 32 | 0 | b |
| Trichloroethylphosphate | — | — | 15 | b |
| Silicone stabilizer | 0.3 | 0.5 | 1.4 | d |
| Water | — | — | 0.6 | e |
| Trichlorofluoromethane | 20 | 28 | 33 | — |
| α-Methylstyrene | 0.5 | 0.5 | — | — |
| Dibutyl tin dilaurate/triethyl-amine (molor ratio 1:1) | 0.5 | 0.5 | — | — |
| Dimethylcyclohexylamine | — | — | 1.1 | |
| Desmodur 44-V Bayer Ag, D-5090 Leverkusen | 120 | 128 | 150 | |
| Index | 125 | 130 | 110 | |
| Gel time (laminator) | 4 | 4 | 31 | |
| Fire characteristics | B2 | B2 | B2 | |
| DIN 4102 (height of flame) | 120 mm | 120 mm | 120 mm | |
| λ-value, determined after 6 weeks at 10° C. (W/mK) | 0.0180 | 0.170 | 0.015 | |

TABLE 2-continued

| | EXAMPLES | | | Component according to the invention |
|---|---|---|---|---|
| | Ex. 10 | Ex. 11 | Ex. 12 | |
| Gross density of test plate | 60 | 50 | 37 | |

(1) Tolylenediamine, mixture of 80 wt. % of 2,4- and 20 wt. % of 2,6-isomer
(2) Tolylenediamine, mixture of 2,3- and 3,4-isomer (40:60% by weight)
(3) EO/PO ratio 44.7/55.3 wt. %
EO = ethylene oxide
PO = propylene oxide Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyol composition comprising:
   (a) at least 10 wt. % of a polyether having an OH number of from 400 to 520 containing at least two hydroxyl groups which is produced by adding an alkylene oxide to 2,3- and/or 3,4-tolylene diamine,
   (b) at least 20 wt. % flame retardant containing phosphorus and/or halogen,
   (c) 5-10 wt. % chain lengthening/crosslinking agent having at least two Zerewitinoff-active hydrogen atoms and a molecular weight of from 32 to 299,
   (d) 0.1 to 2.0 wt. % surface active agent,
   (e) 0 to 2 wt. % water and
   (f) 0 to 30 wt. % of a polyhydroxyl compound different from (a) having a molecular weight of from 300 to 10,000.

2. The composition of claim 1 in which polyether (a) constitutes 10-49 wt. % or the polyol composition.

3. The composition of claim 1 in which polyol (a) constitutes 15-40 wt. % of the polyol composition.

4. The composition of claim 1 in which flame retardant (b) constitutes 25-45 wt. % of the polyol composition.

5. The composition of claim 1 in which polyether (a) is produced by adding 10-90% ethylene oxide and 90-10% propylene oxide to 2,3- and/or 3,4-tolylene diamine.

6. The composition of claim 1 in which polyether (a) is produced by adding 20-80% ethylene oxide and 80-20% propylene oxide to 2,3- and/or 3,4-toluyene diamine.

7. The composition of claim 1 in which polyether (a) has an OH number of from 410 to 520.

8. The composition of claim 1 in which polyether (a) has an OH number of from 450 to 500.

9. A process for the production of a rigid flame-resistant polyurethane foam having a density of from 30 to 20 kg/m$^3$ comprising reacting the polyol composition of claim 1 with a polyisocyanate in quantities such that the isocyanate index is in the range of 105 to 145.

10. The process of claim 9 in which the reaction is carried out in the presence of a blowing agent.

11. The process of claim 10 in which the blowing agent is trichlorotrifluoroethane.

12. The process of claim 11 in which a filler is present during the reaction.

13. The process of claim 12 in which the filler is carbon black and/or aluminum powder.

14. The process of claim 9 in which carbon black and/or aluminum powder is present during the reaction.

* * * * *